(12) United States Patent
Manamohan et al.

(10) Patent No.: US 12,131,256 B2
(45) Date of Patent: Oct. 29, 2024

(54) SYSTEM AND METHOD FOR TRAINING NON-PARAMETRIC MACHINE LEARNING MODEL INSTANCES IN A COLLABORATIVE MANNER

(71) Applicant: Hewlett Packard Enterprise Development LP, Houston, TX (US)

(72) Inventors: Sathyanarayanan Manamohan, Karnatka (IN); Patrick Leon Gartenbach, Baden-Wurttemberg (DE); Markus Philipp Wuest, Baden-Wurttemberg (DE); Krishnaprasad Lingadahalli Shastry, Karnataka (IN); Suresh Soundararajan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 860 days.

(21) Appl. No.: 17/237,574

(22) Filed: Apr. 22, 2021

(65) Prior Publication Data
US 2022/0215245 A1 Jul. 7, 2022

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC .................................... G06N 3/08; G06N 3/04
See application file for complete search history.

(56) References Cited

U.S. PATENT DOCUMENTS

| | | | |
|---|---|---|---|
| 2019/0258953 A1* | 8/2019 | Lang | G06N 3/08 |
| 2019/0332955 A1* | 10/2019 | Manamohan | G06F 18/214 |
| 2019/0332966 A1 | 10/2019 | Gidney | |
| 2020/0125942 A1* | 4/2020 | Pham | G06N 3/084 |
| 2020/0204341 A1* | 6/2020 | Williams | G06N 3/08 |
| 2020/0401890 A1 | 12/2020 | Xu et al. | |

* cited by examiner

*Primary Examiner* — Ryan C Vaughn
*Assistant Examiner* — Simon Fischer Ellis
(74) *Attorney, Agent, or Firm* — Hewlett Packard Enterprise Patent Department

(57) ABSTRACT

A system and a method for training non-parametric Machine Learning (ML) model instances in a collaborative manner is disclosed. A non-parametric ML model instance is trained at each of a plurality of data processing nodes to obtain a plurality of non-parametric ML model instances. Each non-parametric ML model instance developed at each data processing node is shared with each of remaining data processing nodes of the plurality of data processing nodes. Each non-parametric ML model instance is processed through a trainable parametric combinator to generate a composite model at each of the plurality of data processing nodes. The composite model is trained at each of the plurality of data processing nodes, over the respective local dataset, using Swarm learning to obtain trained composite models.

20 Claims, 5 Drawing Sheets

SYSTEM AND METHOD FOR TRAINING NON-PARAMETRIC MACHINE LEARNING MODEL INSTANCES IN A COLLABORATIVE MANNER

BACKGROUND

Machine Learning (ML) models are trained to produce output based on their learning developed upon training data. During training of an ML model, generally a mapping function is formulated to map input data to an output. Based on requirements, performance of various ML algorithms is generally evaluated to identify an optimally performing ML algorithm that provides a suitable mapping function ML algorithms that make assumptions about form of a mapping function are used to derive parametric ML models. That is, a parametric ML model learns using a predefined mapped function whose states (weights/biases) are trained using training data. Logistic Regression, Linear Discriminant Analysis, Perceptron, Naive Bayes, and Neural Networks are few examples of parametric ML algorithms.

Non-parametric ML models do not make any assumptions about a mapping function and, therefore, a required mapping function is built on-the-fly during training of a non-parametric ML model.

One way to train an ML model is through collaborative learning, also known as Swarm learning. Swarm learning involves collectively training an ML model upon local data present at different sites. That is, ML models are locally trained on local data present at each node, and states (weights/biases), also called parameters, are provided to a master node that merges such parameters and redistributes a merged parameter to each node. The merged parameter is utilized by each ML model to continue their learning.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one, in the drawings.

DETAILED DESCRIPTION OF THE INVENTION

Figure 1:
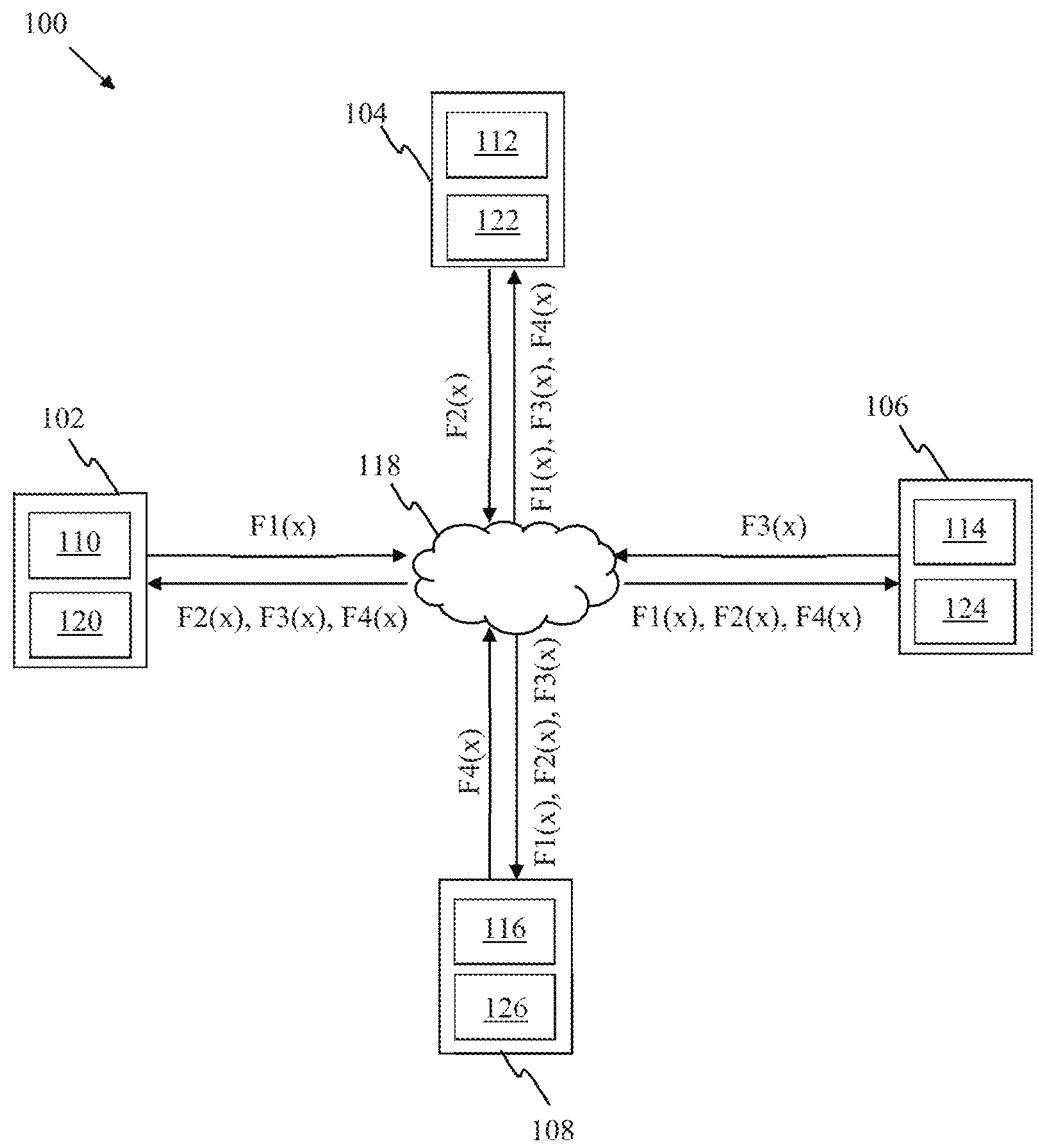
FIG. 1 illustrates a network connection diagram of a blockchain system for training non-parametric Machine Learning (ML) models in a collaborative manner, in accordance with an embodiment of the present disclosure.

Swarm learning can be utilized for parametric Machine Learning (ML) models. However, non-parametric ML models cannot be trained collaboratively, because unlike parametric ML models, non-parametric ML models do not have parameters that can be globally optimized in a collaborative manner.

The present disclosure provides a system and a method for training of non-parametric ML models in a collaborative manner while ensuring privacy of data and the ML models. As explained further in the following paragraphs, in the system and method of the present disclosure, non-parametric ML models trained and developed over respective data processing nodes may be shared with participating data processing nodes in an obfuscated format. Each of the non-parametric ML models may be processed through a trainable parametric combinator to obtain a composite model, at each of the data processing nodes. At each data processing node, a composite model may be trained over local dataset, using coordinated learning technique i.e., Swarm learning, to obtain a trained composite model. In this manner, present disclosure provides training of non-parametric ML models using Swarm learning while preserving privacy of data and ML models.

By way of example, a data processing node may be responsible for training upon data of a hospital using a non-parametric ML model. The data of the hospital may comprise health records, clinical trials, patient history, administrative data, and the like. Similarly, other data processing nodes may be responsible for training upon data of other hospitals. It must be noted that the data of all the hospitals may have a same schema. Through training, different non-parametric ML models may build upon respective data. But a non-parametric ML model's efficiency would decrease if data from another hospital is processed. This is generally because the non-parametric ML model has not been trained over such data from another hospital. As described earlier, each non-parametric ML model has its local bias that is learnt during training from a local dataset. Such local bias of a non-parametric ML model may not work for processing new data, and result in an inefficient non-parametric ML model. In order to minimize the effect of local bias and to build an efficient or superior non-parametric ML model, Swarm learning may be utilized. Prior to this, the non-parametric ML models are required to be processed to make them useable for Swarm learning.

As described above, each of a plurality of data processing nodes may be responsible for processing data of respective hospitals located at different sites. Upon training, non-parametric ML model developed at each data processing node may be shared with remaining data processing nodes. In one aspect, a non-parametric ML model instance, created at each of the plurality of data processing nodes, may be obfuscated before sharing with remaining data processing nodes. Obfuscating the non-parametric ML model results in preserving privacy of an ML model instance. The obfuscated ML models of each of the plurality of data processing nodes are then shared with neighboring data processing nodes to build a stacked ensemble of ML models.

At each of the plurality of data processing nodes, respective stacked ensemble of ML models may be processed through a trainable parametric combinator to generate a composite model. The trainable parametric combinator may be a parametric ML model, such as a Neural Network, that uses predictions of non-parametric ML models as its input and produces its prediction or inference. That is, outputs of the non-parametric ML models are treated as inputs to the parametric ML model, resulting in generation of a composite model at each of the plurality of data processing nodes.

The composite model at each of the plurality of data processing nodes may then be trained at respective data present locally, using Swarm learning (or alternatively referred as coordinated learning technique), to obtain a trained composite model.

FIG. 1 illustrates a network connection diagram of a blockchain system 100 for training non-parametric Machine Learning (ML) models in a collaborative manner. Within the blockchain system 100, data processing nodes 102, 104, 106, and 108 are connected with each other. For ease of illustration and explanation, only four data processing nodes are illustrated, but it must be understood that a typical blockchain system would comprise several such data processing nodes. Each of the data processing nodes 102, 104, 106, and 108 may be responsible to train a non-parametric ML model over respective local dataset. The non-parametric ML model may be one of Decision-Tree, Random Forest, Bayesian model, K-Nearest Neighbors (KNN), and Support Vector Machines (SVM).

In one implementation, the data processing node 102 may train a non-parametric ML model instance over local dataset 110. Similarly, remaining data processing nodes 104, 106, and 108 may train non-parametric ML model instances using local dataset 112, 114, and 116 respectively. Accordingly, non-parametric ML model instances $F1(x)$, $F2(x)$, $F3(x)$, and $F4(x)$ may be developed at the data processing nodes 102, 104, 106, and 108 respectively.

A non-parametric ML model instance developed at a data processing node is shared with remaining data processing nodes through a communication network 118. For example, the data processing nodes 102 shares its non-parametric ML model instance i.e. $F1(x)$ with each of the data processing nodes 104, 106, and 108. In this manner, the non-parametric ML model instances $F1(x)$, $F2(x)$, $F3(x)$, and $F4(x)$ may become available at each the data processing nodes 102, 104, 106, and 108. In one implementation, each data processing node may obfuscate its non-parametric ML model instance before sharing with remaining data processing nodes, to maintain privacy of the non-parametric ML model instance. For example, the non-parametric ML model instances $F1(x)$, $F2(x)$, $F3(x)$, and $F4(x)$ may be obfuscated using Open Neural Network Exchange (ONNX) before they are shared amongst the data processing nodes 102, 104, 106, and 110. ONNX is an intermediary representation of an ML model that enables sharing of the ML model from one machine learning platform to another.

In an aspect, each of the plurality of non-parametric ML model instances $F1(x)$, $F2(x)$, $F3(x)$, and $F4(x)$ may be processed through a trainable parametric combinator to generate a composite model at each of the data processing nodes 102, 104, 106, and 108. The trainable parametric combinator may be one of, but not limited to, Logistic Regression, Linear Discriminant Analysis, Perceptron, Naive Bayes, and Neural Networks. It must be carefully noted that the trainable parametric combinator is trainable and parametric in nature.

In one implementation, ML model instances $F1(x)$, $F2(x)$, $F3(x)$, and $F4(x)$ may be combined at each of the data processing nodes 102, 104, 106, and 108, using the trainable parametric combinator. The trainable parametric combinator may create an ensemble with a Neural Network that moderates and evaluates predictions of the non-parametric ML model instances. That is, the trainable parametric combinator merges predictions of each of the non-parametric ML model instances. Since a neural network is used as the trainable parametric combinator, weights of this network could be adjusted to further improve accuracy using Swarm learning. In an aspect, using the trainable parametric combinator, combination of knowledge of each non-parametric ML model instance provides a considerable advantage in reducing impact of respective local bias, and therefore, helps building a more robust non-parametric ML model instance.

As illustrated in FIG. 1, composite models 120, 122, 124, and 126 are developed using the trainable parametric combinator at the data processing nodes 102, 104, 106, and 108 respectively. These composite models 120, 122, 124, and 126 may be trained using Swarm learning to obtain trained composite models at each of the data processing nodes 102, 104, 106, and 108 respectively. Parameters of such trained composite models may then be shared, aggregated, and distributed using Swarm learning.

Figure 2:
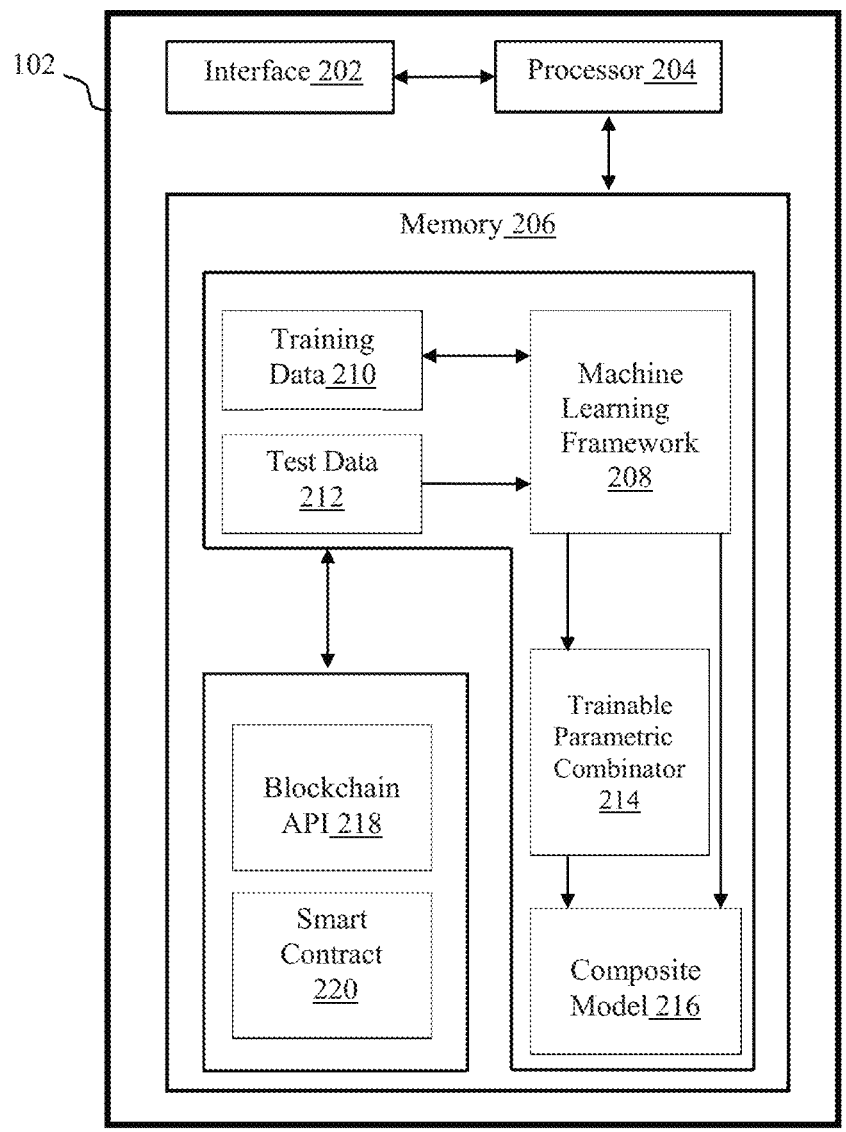
FIG. 2 illustrates a block diagram showing different components of a data processing node of a blockchain system, in accordance with an embodiment of the present disclosure.

FIG. 2 illustrates a block diagram showing different components of the data processing node 102, in accordance with an embodiment of the present disclosure. It must be understood that structure of the data processing nodes 104, 106, and 108 is similar to the data processing node 102.

The data processing node 102 may comprise an interface 202, a processor 204, and a memory 206. The processor 204 may be coupled with the memory 206 and may be programmed to execute a machine learning framework 208 and/or other instructions to perform various operations, each of which are described herein below.

The memory 206 may store program instructions for performing several functions through which training of non-parametric ML model may be performed by the data processing node 102. A few such program instructions stored in the memory 206 include program instruction to train a non-parametric ML model, program instructions to share each non-parametric ML model, program instructions to generate a composite model, and program instructions to obtain a trained composite data model using Swarm learning.

The processor 204 may perform program instructions to train a non-parametric Machine Learning (ML) model through the ML framework 208. The non-parametric ML model may be trained on training data 210 available locally at the data processing node 102. Upon generation of the non-parametric ML model, test data 212 may be utilized to test the non-parametric ML model. A non-parametric ML model instance may be created and shared with participating data processing nodes. Simultaneously, non-parametric ML model instances corresponding each of participating data processing nodes may be received at the data processing node 102. A trainable parametric combinator 214 may be utilized the received non-parametric ML model instances to realize respective learnings of participating data processing nodes and create a composite data model 216. This composite model 216 may be trained using Swarm learning to obtain a trained composite model at data processing node 102. Similarly, a trained composite model would be created at each of the participating data processing nodes.

In an aspect, each of the plurality of data processing nodes 102, 104, 106, and 108 may communicate among each other for co-ordination. Further, each data processing may write a blockchain transaction using, for example, the blockchain API 218.

In another aspect, each of the plurality of data processing nodes 102, 104, 106, and 108 may enroll to participate in an iteration of respective non-parametric ML model building. For example, a smart contract 220 may encode rules for enrolling a data processing node for participation in an iteration of ML model building. Thus, a blockchain system may store an immutable record of the state transitions of a data processing node 102. In this manner, the blockchain system may store a current and historic state of a non-parametric ML model as well as the trained composite model.

Figure 3:
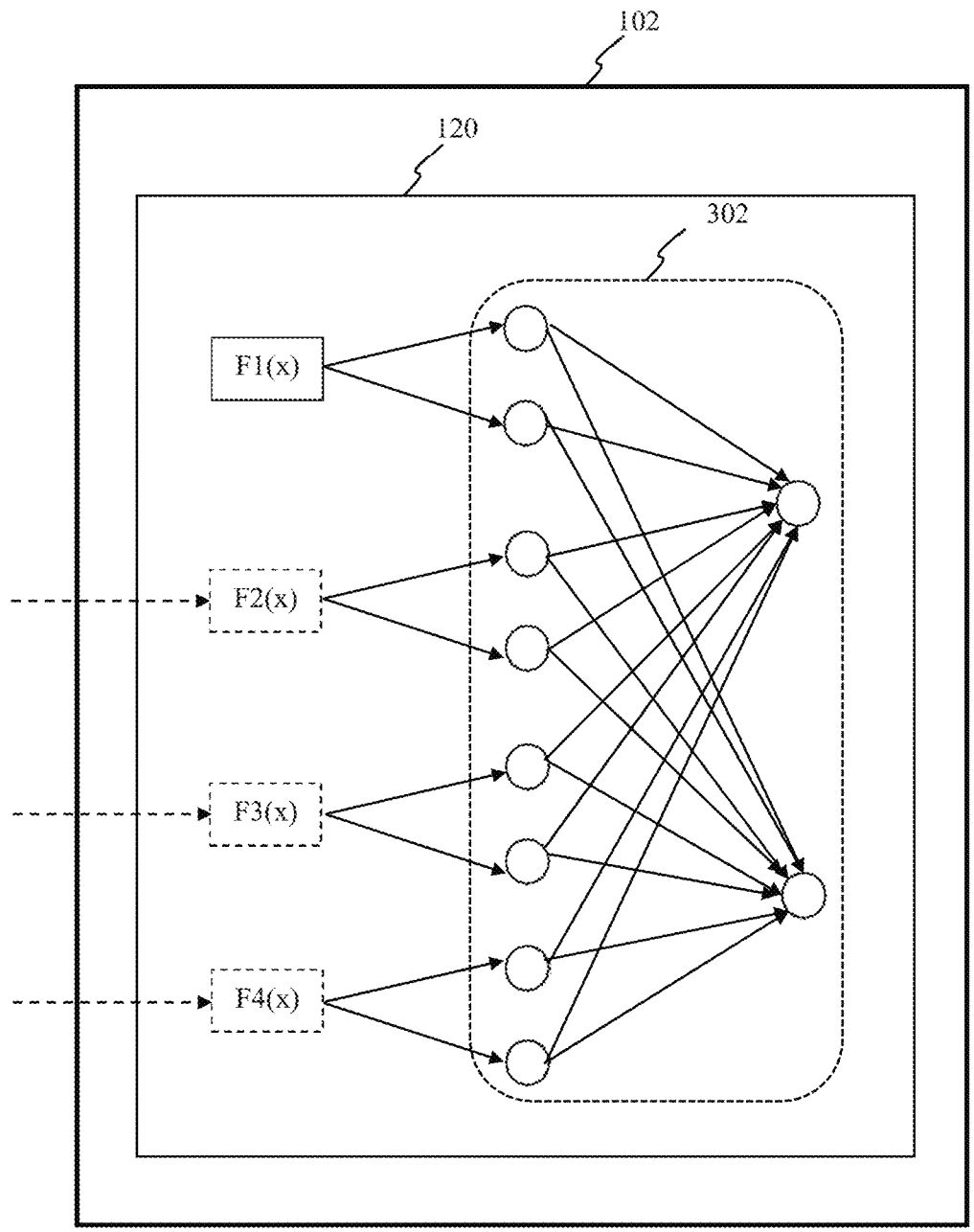
FIG. 3 illustrates a block diagram of a data processing node showing development of a composite model, in accordance with an embodiment of the present disclosure.

FIG. 3 illustrates a block diagram of the data processing node 102 showing development of the composite model 120, in accordance with an embodiment of the present disclosure. It must be understood that the composite models 122, 124, and 126 are generated at remaining data processing nodes 104, 106, and 108 in a similar manner.

As illustrated, the data processing node 102 having non-parametric ML model instances $F1(x)$ developed by it receives non-parametric ML model instances $F2(x)$, $F3(x)$, and $F4(x)$. It is already explained above the non-parametric ML model instances $F2(x)$, $F3(x)$ and $F4(x)$ are received from participating data processing nodes 104, 106, and 108 respectively. Subsequently, all the non-parametric ML model instances $F1(x)$, $F2(x)$, $F3(x)$, and $F4(x)$ may merge with a trainable parametric combinator 302 to produce the composite model 120. As already explained above, the trainable parametric combinator 302 is a customizable Neural Network. The trainable parametric combinator 302 may be chosen based on use case enabling participants to choose from a predefined trainable parametric combinator or provide Application Programming Interface (APIs) to import a specific type of trainable parametric combinator.

In an exemplary aspect, the composite model 120 may be trained using Swarm learning. As described earlier, collaborative training of non-parametric ML models is difficult because of lack of parameters or predefined mapping functions. The composite model 120 may however turn knowledge from shared non-parametric ML models into parameters for the trainable parametric combinator 302 to arrive at a prediction or inference.

Upon building, the composite model 120 may be trained over the respective local dataset, using Swarm learning to obtain a trained composite model. Similarly, the composite model 122, 124, and 126 may be built at the data processing nodes 104, 106, and 108, and trained on their respective local dataset to obtain trained composite models. The trained composite model may combine output or predictions of locally trained model instances moderated over by the trainable parametric combinator 302 trained on decentralized data for achieving the goal of collaborative learning on decentralized data.

Figure 4:
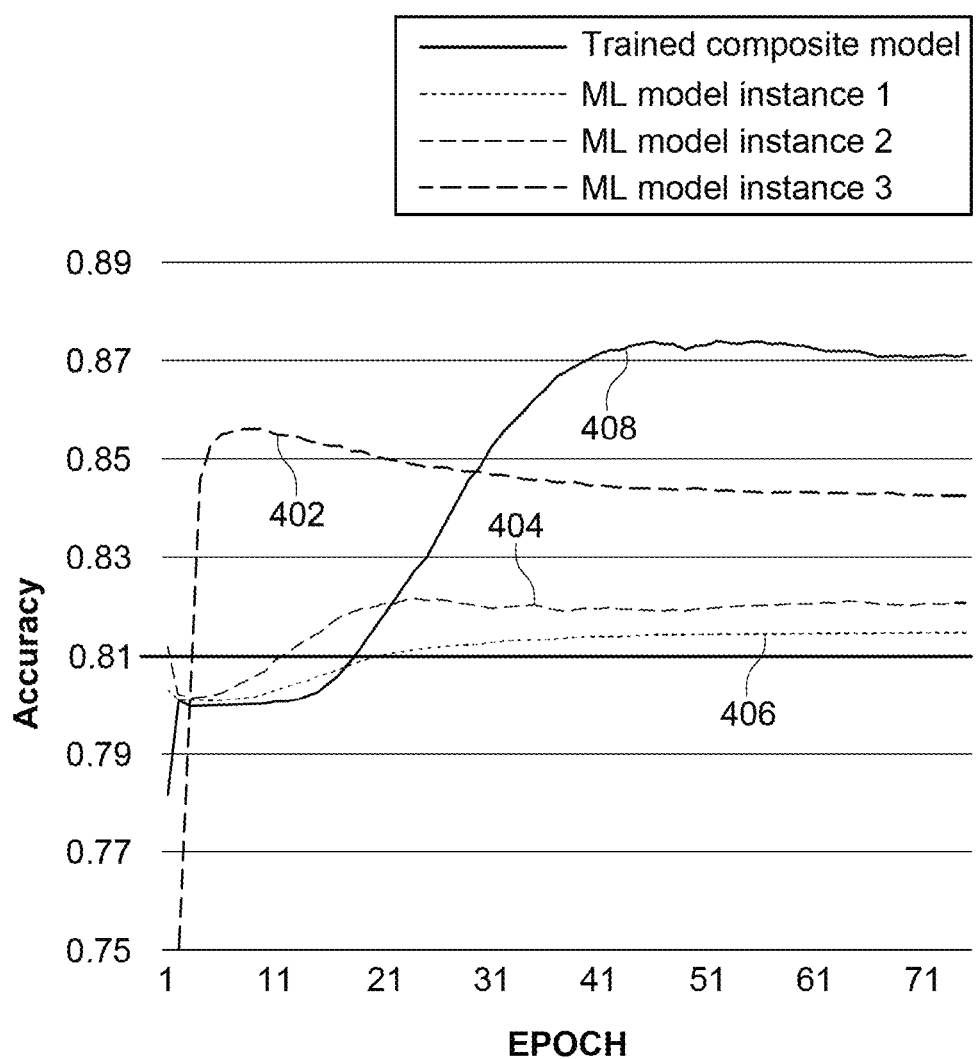
FIG. 4 illustrates an exemplary representation of comparison of output of a non-parametric ML model developed in a collaborative manner with outputs of non-parametric ML models, in accordance with an embodiment of the present disclosure.

FIG. 4 illustrates an exemplary representation of comparison of Output of a non-parametric ML model developed in a collaborative manner with outputs of non-parametric data models, in accordance with an embodiment of the present disclosure. A wine dataset was processed on the blockchain system 100 to predict quality of a wine based on factors such as fixed acidity, alcohol content, and viscosity.

Output curves 402, 404, and 406 represent outputs of non-parametric ML model instances 1, 2, and 3 respectively, individually processing attributes of fixed acidity, alcohol content, and viscosity. Each of the non-parametric ML model instances 1, 2, and 3 has an individual bias to evaluate data distribution for wine dataset. Accuracy shown through the output curves 402, 404, and 406 representing performance of non-parametric ML model instances slightly increases when the number of EPOCHS are low, but eventually decrease or come to a constant, i.e. below 0.85.

On the other hand, output curve 408 showing result of the trained composite model (non-parametric ML model developed in a collaborative manner) represents higher accuracy than the output curves 402, 404, and 406 representing performance of non-parametric ML model instances.

Figure 5:
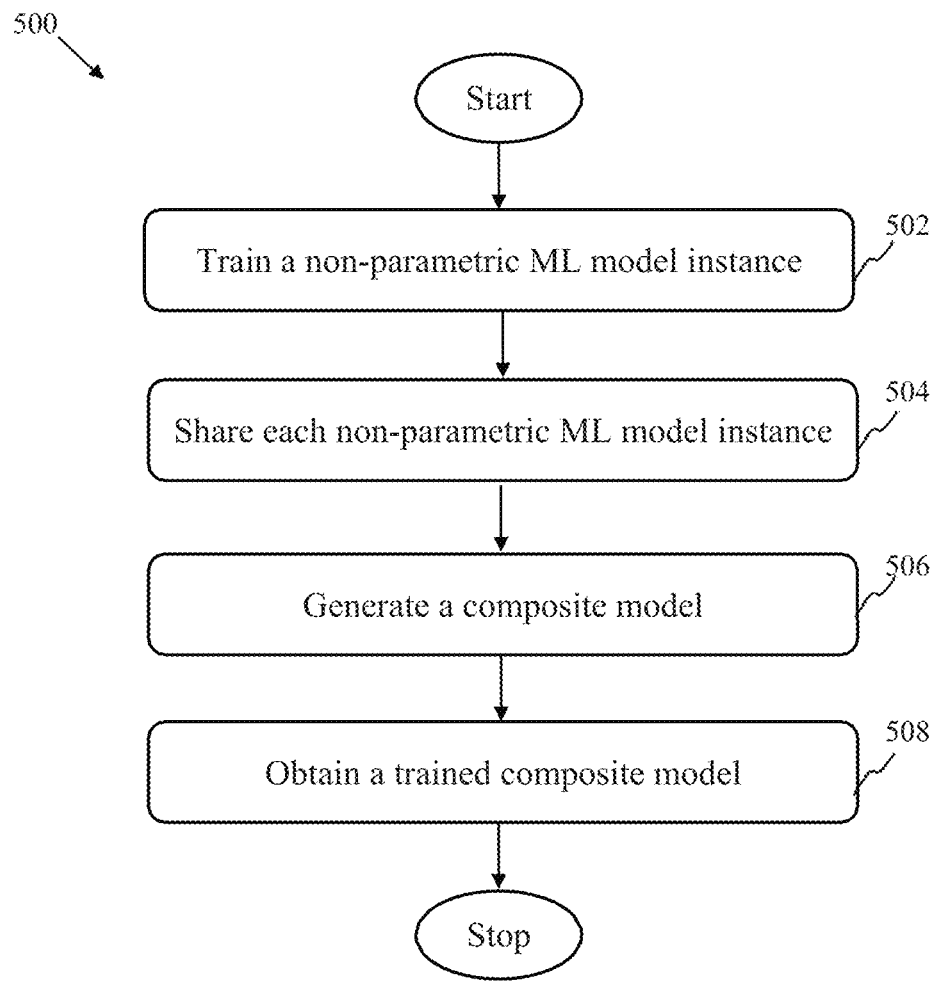
FIG. 5 illustrates a flowchart showing a method for training non-parametric ML models in a collaborative manner, in accordance with an embodiment of the present disclosure.

Referring now to FIG. 5, a method of training non-parametric ML models in a collaborative manner is described with reference to the flowchart 500. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At block 502, a non-parametric ML model instance may be trained at each of a plurality of data processing nodes to obtain a plurality of non-parametric ML models. The non-parametric ML model instance may be one of Decision-Tree, Random Forest. Bayesian model, K-Nearest Neighbors (KNN), and Support Vector Machines (SVM).

At block 504, each non-parametric ML model instance developed at each data processing node may be shared with each of remaining data processing nodes of the plurality of data processing nodes. The non-parametric ML model instances may be obfuscated using Open Neural Network Exchange (ONNX) before sharing.

At block 506, each of the plurality of non-parametric ML model instances may be processed through a trainable parametric combinator to generate a composite model at each of the plurality of data processing nodes. The trainable parametric combinator may process output received from each of the non-parametric ML model instances. The trainable parametric combinator may be a parametric ML model, such as Logistic Regression, Linear Discriminant Analysis, Perceptron, Naive Bayes, and Neural Networks.

At block 508, the composite model may be trained at each of the plurality of data processing nodes, over the respective local dataset to obtain trained composite models using Swarm teaming.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hard-wired circuit components. Also, although the discussion focuses on uplink medium control with respect to frame aggregation, it is contemplated that control of other types of messages are applicable.

In the above description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

As used in the present specification, the term "machine learning" refers broadly to an artificial intelligence technique in which a computer's behaviour evolves based on empirical data. In some cases, input empirical data may come from databases and yield patterns or predictions thought to be features of the mechanism that generated the data. Further, a major focus of machine learning is the design of algorithms that recognize complex patterns and makes intelligent decisions based on input data. Machine learning may incorporate a number of methods and techniques such as; supervised learning, unsupervised learning, reinforcement learning, multivariate analysis, case-based reasoning, backpropagation, and transduction.

In some embodiments, a system and a method for training non-parametric ML models can include a physical computer-readable medium bearing instructions for processing the non-parametric ML models. The computer-readable medium may be adapted to develop and train a non-parametric ML model, and utilize Swarm learning. The present disclosure maintains data privacy by processing data in a decentralized manner. Non-parametric ML models trained on multiple edge nodes may be provided to a trainable parametric combinator to output a composite model. Swarm learning may then process such composite data models.

In the above description and figures, some example and/or implementations of systems and/or methods for training non-parametric ML models are described. As used herein, cloud server may be employed to provide a service, such as data processing, data communication, data storage, or any other product or activity that may be capable of running on the cloud server, or a cloud-based service. As used herein, the cloud server may be any appropriate combination of physical and virtual resources pooled for computing and/or storage purposes. For example, the cloud server may include any appropriate number of individual resources, servers, and server groups including virtual instances of resources, servers, and server groups. The cloud server may include any appropriate number of clouds and/or other network of resources accessible by the edge system.

Edge system may correspond to a device capable of processing/computing data received from data sources such as mobile devices, desktops, laptops, tablets, interact of things (IoT) devices, medical equipment, industrial equipment, automobiles and other vehicles, robots, drones, etc., may execute applications that include artificial intelligence/machine learning models i.e. data models. In some implementations, the edge system may receive data from sensors and other interfaces to capture input data for a data model for generation of prediction data, confidence scores, performance scores.

Implementations described hereinabove provide a system for ML model management, ML model deployment, ML model feedback collection, ML model re-training, etc. in support of applications executable on the edge system. ML models may be selected and deployed based on characteristics shared between the edge system and other edge systems, and/or the cloud server. Information received from the edge system may be used to update/re-train instances of ML models, and the ML models may be tracked, documented, and stored such that ML models may be specifically managed and customized for a single edge system, a group of edge systems, etc. ML models are continuously or periodically monitored for accuracy, updated based on information, and deployed to various edge systems.

A computer network may be implemented using wired and/or wireless communication technologies. The computer network may comprise various network components such as switches, Provide Edge (PE) routers, Customer Edge (CE) routers, intermediate routers, bridges, computers, servers, and the like. The network devices present in the computer network may implement an Interior Gateway Protocol (IGP) including, but not limited to, Open Shortest Path First (OSPF), Routing Information Protocol (RIP), Intermediate System to Intermediate System (IS-IS), and Enhanced Interior Gateway Routing Protocol (EIGRP).

An interface may be used to provide input or fetch output from the system. The interface may be implemented as a Command Line Interface (CLI), Graphical User Interface (GUI). Further, Application Programming Interfaces (APIs) may also be used for remotely interacting with edge systems and cloud servers.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method of training non-parametric Machine Learning (ML) model instances comprising:
    training a non-parametric ML model instance over a first respective local dataset at a first subset of a plurality of data processing nodes, to obtain a plurality of non-parametric ML model instances;
    sharing the plurality of non-parametric ML model instances that are developed at the first subset of the plurality of data processing nodes with a second subset of the plurality of data processing nodes,
    wherein the second subset is distinct from the first subset, wherein the first subset comprises more than one of a first processing node, the second subset comprises more than one of a second processing node, and the second processing node is different from the first processing node, and
    wherein the first subset and the second subset comprise less than all of the plurality of data processing nodes;
    generating, at the second subset of the plurality of data processing nodes, a set of composite models at the second subset of the plurality of data processing nodes by processing the non-parametric ML model instances through a trainable parametric combinator;
    training the set of composite models at the second subset of the plurality of data processing nodes, the training utilizing a second respective local dataset, at the second subset of the plurality of data processing nodes in a coordinated learning technique to obtain a set of trained composite models,
    wherein the second subset of the plurality of data processing nodes independently utilizes swarm learning to train the set of composite models; and
    initiating an inference process of the set of trained composite models.

2. The method as claimed in claim 1, wherein the non-parametric ML model instances are one of a Decision-Tree, Random Forest, Bayesian model, K-Nearest Neighbors (KNN), and Support Vector Machines (SVM).

3. The method as claimed in claim 1, wherein the trainable parametric combinator is a parametric ML model selected from at least one of Logistic Regression, Linear Discriminant Analysis, Perceptron, Naive Bayes, and Neural Network.

4. The method as claimed in claim 1, wherein the non-parametric ML model instances are obfuscated by the first subset of the plurality of data processing nodes before sharing with the second subset of the plurality of data processing nodes.

5. The method as claimed in claim 4, wherein at least one non-parametric ML model instance is obfuscated using an Open Neural Network Exchange (ONNX) model.

6. The method of claim 1, wherein the inference process is initiated at the second subset of the plurality of data processing nodes.

7. The method of claim 1, further comprising:
    generating a set of output curves representing performance of the non-parametric ML model for the set of composite models.

8. The method of claim 1, wherein the trainable parametric combinator utilizes parameters from the plurality of non-parametric ML model instances in generating the set of composite models.

9. The method of claim 1, wherein the method further comprising:
    sharing, aggregating, and distributing, by the second subset, parameters of the set of composite models using swarm learning.

10. The method of claim 1, wherein the sharing between the first subset and the second subset comprises writing a blockchain transaction using a blockchain application programming interface (API).

11. A blockchain system for training non-parametric Machine Learning (ML) model instances comprising:
    a plurality of data processing nodes comprising:
        a first subset of a plurality of data processing nodes, and
        a second subset of the plurality of data processing nodes,
        wherein the second subset is distinct from the first subset, wherein the first subset comprises more than one of a first processing node, the second subset comprises more than one of a second processing node, and the second processing node is different from the first processing node, and
        wherein the first subset and the second subset comprise less than all of the plurality of data processing nodes,
    wherein the first subset storing programmed instructions to:
        train a non-parametric Machine Learning (ML) model instance over a first respective local dataset at the first subset of the plurality of data processing nodes to obtain a plurality of non-parametric ML model instances;
        share the plurality of non-parametric ML model instances that are developed at the first subset of the plurality of data processing nodes with the second subset of the plurality of data processing nodes;
    wherein the second subset storing programmed instructions to:
        generate, at the second subset of the plurality of data processing nodes, a set of composite models at the second subset of the plurality of data processing nodes by processing the plurality of non-parametric ML model instances through a trainable parametric combinator;
        train the set of composite models at the second subset of the plurality of data processing nodes, the training utilizing a second respective local dataset at the second subset of the plurality of data processing nodes in a coordinated learning technique to obtain a set of trained composite models,
        wherein each of the second subset of the plurality of data processing nodes independently utilizes swarm learning to train the set of composite models; and
        initiate an inference process of the set of trained composite models.

12. The blockchain system as claimed in claim 11, wherein the non-parametric ML model instances are at least one of a Decision-Tree, Random Forest, Bayesian model, K-Nearest Neighbors (KNN), and Support Vector Machines (SVM).

13. The blockchain system as claimed in claim 11, wherein the trainable parametric combinator is a parametric ML model selected from at least one of Logistic Regression, Linear Discriminant Analysis, Perceptron, Naive Bayes, and Neural Network.

14. The blockchain system as claimed in claim 11, wherein the non-parametric ML model instances are obfuscated by the first subset of the plurality of data processing nodes before sharing with the second subset of the plurality of data processing nodes.

15. The blockchain system as claimed in claim 14, wherein at least one non-parametric ML model instance is obfuscated using an Open Neural Network Exchange (ONNX) model.

16. A non-transitory computer-readable storage medium storing program instructions for training non-parametric Machine Learning (ML) model instances, the instructions, when executed on a blockchain system, perform the steps of:
    training a non-parametric ML model instance over a first respective local dataset at a first subset of a plurality of data processing nodes, to obtain a plurality of non-parametric ML model instances;
    sharing the plurality of non-parametric ML model instances that are developed at the first subset of the plurality of data processing nodes with a second subset of the plurality of data processing nodes,
    wherein the second subset is distinct from the first subset, wherein the first subset comprises more than one of a first processing node, the second subset comprises more than one of a second processing node, and the second processing node is different from the first processing node, and
    wherein the first subset and the second subset comprise less than all of the plurality of data processing nodes;
    generating, at the second subset of the plurality of data processing nodes, a set of composite models at the second subset of the plurality of data processing nodes by processing the non-parametric ML model instances through a trainable parametric combinator;
    training the set of composite models at the second subset of the plurality of data processing nodes, the training utilizing a second respective local dataset at the second subset of the plurality of data processing nodes in a coordinated learning technique to obtain a set of trained composite models,
    wherein the second subset of the plurality of data processing nodes independently utilizes swarm learning to train the set of composite models; and
    initiating an inference process of the set of trained composite models.

17. The non-transitory computer-readable storage medium in claim 16, wherein the non-parametric ML model instances are one of a Decision-Tree, Random Forest, Bayesian model, K-Nearest Neighbors (KNN), and Support Vector Machines (SVM).

18. The non-transitory computer-readable storage medium in claim 16, wherein the trainable parametric combinator is a parametric ML model selected from at least one of Logistic Regression, Linear Discriminant Analysis, Perceptron, Naive Bayes, and Neural Network.

19. The non-transitory computer-readable storage medium in claim 16, wherein the non-parametric ML model instances are obfuscated by the first subset of the plurality of data processing nodes before sharing with the second subset of the plurality of data processing nodes.

20. The non-transitory computer-readable storage medium in claim 19, wherein at least one non-parametric ML model instance is obfuscated using an Open Neural Network Exchange (ONNX) model.

* * * * *